United States Patent
Toma et al.

(10) Patent No.: US 11,629,671 B2
(45) Date of Patent: Apr. 18, 2023

(54) ENGINE SYSTEM

(71) Applicant: SUBARU CORPORATION, Tokyo (JP)

(72) Inventors: Kouhei Toma, Tokyo (JP); Takeshi Tsuda, Tokyo (JP); Ryo Adachi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/573,113

(22) Filed: Jan. 11, 2022

(65) Prior Publication Data

US 2022/0243686 A1 Aug. 4, 2022

(30) Foreign Application Priority Data

Feb. 4, 2021 (JP) .............................. JP2021-016253

(51) Int. Cl.
*F02M 23/00* (2006.01)
*F02B 17/00* (2006.01)

(52) U.S. Cl.
CPC ............. *F02M 23/00* (2013.01); *F02B 17/00* (2013.01)

(58) Field of Classification Search
CPC .................................. F02M 23/00; F02B 17/00
USPC ................ 123/295, 298, 301, 302, 308, 585
See application file for complete search history.

(56) References Cited

FOREIGN PATENT DOCUMENTS

| JP | 2004-003428 A | | 1/2004 | |
|----|----|----|----|----|
| JP | 3613018 | * | 1/2005 | ............. F02D 41/30 |
| JP | 3613020 | * | 1/2005 | ............. F02D 41/30 |
| JP | WO200517348 | * | 10/2006 | ............. F02D 41/02 |
| JP | 2012092767 | * | 5/2012 | ............. Y02T 10/12 |

* cited by examiner

*Primary Examiner* — Hai H Huynh
(74) *Attorney, Agent, or Firm* — McGinn I.P. Law Group, PLLC.

(57) ABSTRACT

An engine system includes a combustion chamber and an air supplier. The combustion chamber is formed in a cylinder. The air supplier is configured to supply air to a circumferential area of the combustion chamber. The circumferential area is near an inner circumferential surface of the cylinder. The air supplier is configured to supply air to the circumferential area before ignition to gather a rich air-fuel mixture that is present in the combustion chamber to a central area of the combustion chamber such that a stratified body consisting of a layer of the air-fuel mixture in the central area and a layer of the air in the circumferential area is formed.

20 Claims, 4 Drawing Sheets

ENGINE SYSTEM

CROSS-REFERENCE TO RELATED APPLICATIONS

The present application claims priority from Japanese Patent Application No. 2021-016253 filed on Feb. 4, 2021, the entire contents of which are hereby incorporated by reference.

BACKGROUND

The disclosure relates to an engine system including an engine.

An exemplary engine system configured to cause less engine knock is disclosed by Japanese Unexamined Patent Application Publication (JP-A) No. 2004-3428, for example.

SUMMARY

An aspect of the disclosure provides an engine system including a combustion chamber and an air supplier. The combustion chamber is formed in a cylinder. The air supplier is configured to supply air to a circumferential area of the combustion chamber. The circumferential area is near an inner circumferential surface of the cylinder. The air supplier is configured to supply air to the circumferential area before ignition to gather a rich air-fuel mixture that is present in the combustion chamber to a central area of the combustion chamber such that a stratified body consisting of a layer of the air-fuel mixture in the central area and a layer of the air in the circumferential area is formed.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

According to JP-A No. 2004-3428, turbulence is generated in a combustion chamber by feeding high-pressure air into the combustion chamber in coordination with the timing of ignition of an air-fuel mixture. Thus, according to JP-A No. 2004-3428, the combustion rate in a late phase of the combustion cycle is increased so that knocking is reduced. Such a technique, disclosed by JP-A No. 2004-3428, does not satisfactorily reduce knocking. Hence, there has been a demand for more appropriate knock reduction.

It is desirable to provide an engine system that is less likely to cause engine knock.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
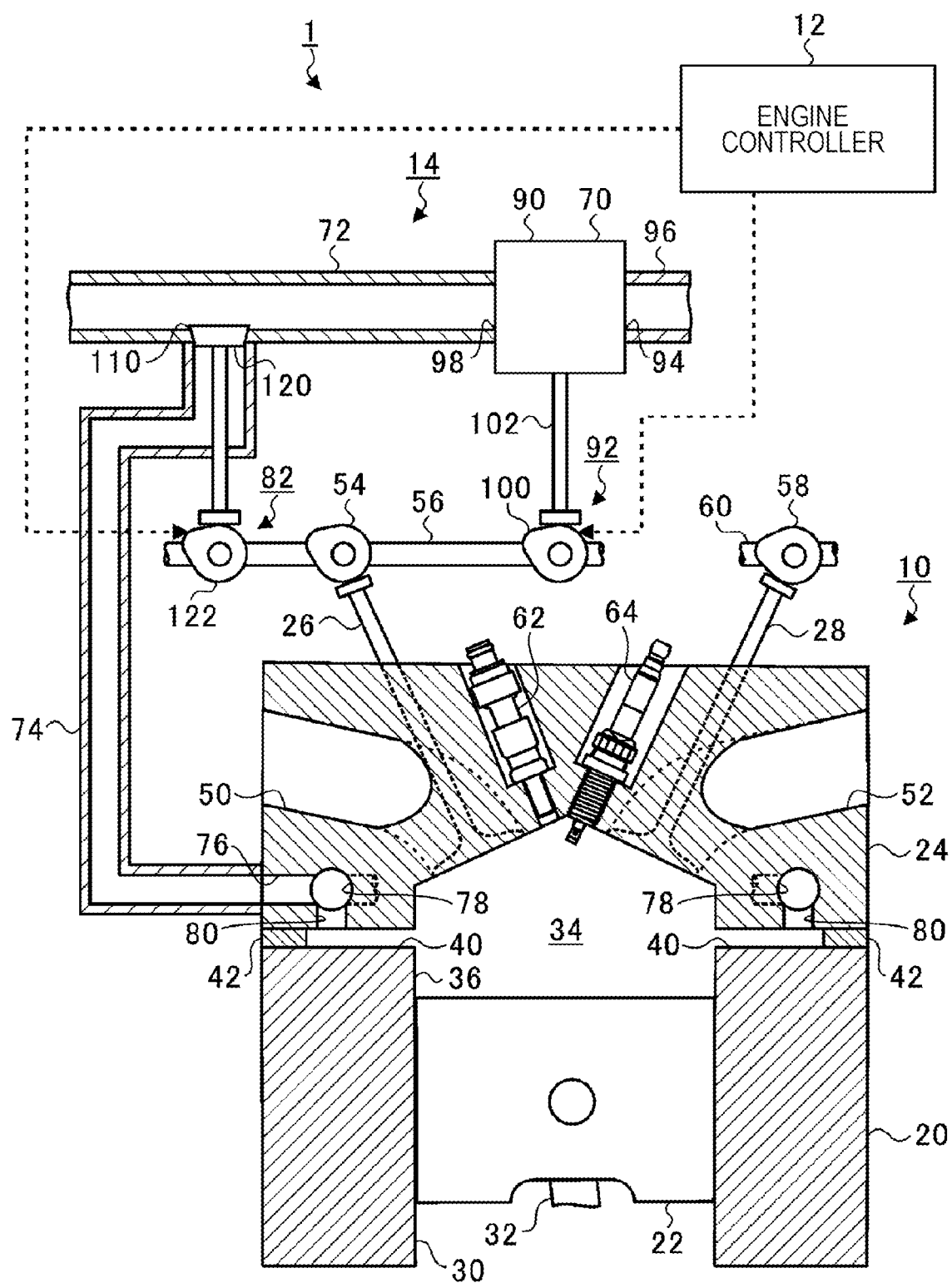
FIG. 1 schematically illustrates an engine system according to an embodiment.

FIG. 1 schematically illustrates an engine system 1 according to an embodiment. The engine system 1 is applied to, for example, a hybrid vehicle or an engine vehicle. The engine system 1 includes an engine 10, an engine controller 12, and an air supplier 14. The engine 10 includes a cylinder block 20, a piston 22, a cylinder head 24, an intake valve 26, and an exhaust valve 28.

The cylinder block 20 includes a plurality of cylinders 30. The piston 22 is slidably housed in each of the cylinders 30. The piston 22 is coupled to a crankshaft (not illustrated) with a connecting rod 32. The crankshaft rotates by following a reciprocal motion of the piston 22.

The cylinder head 24 is positioned across the cylinder block 20 from the crankshaft. The cylinder head 24 is disposed on the cylinder 30 in such a manner as to cover the cylinder 30 and is coupled to the cylinder block 20. The cylinder 30 has a combustion chamber 34 thereinside. The combustion chamber 34 is defined by an inner circumferential surface 36 of the cylinder 30, the top surface of the piston 22, and the inner surface of the cylinder head 24.

A gap 40 is provided between the cylinder block 20 and the cylinder head 24. The gap 40 is a flat annular space surrounding the combustion chamber 34 and is continuous with the combustion chamber 34. A gasket 42 is disposed between the cylinder block 20 and the cylinder head 24 and on the outer circumference of the gap 40. The gasket 42 is nipped between the cylinder block 20 and the cylinder head 24. The gap 40 is sealed by the gasket 42.

The cylinder head 24 has an intake port 50 and an exhaust port 52. The intake port 50 and the exhaust port 52 are each continuous with the combustion chamber 34.

The intake valve 26 is disposed in the intake port 50. The valve disc of the intake valve 26 is positioned at an opening of the intake port 50 that is on the combustion chamber 34. The proximal end of the intake valve 26 is in contact with an intake cam 54. The intake cam 54 is coupled to an intake camshaft 56. The intake camshaft 56 rotates in conjunction with the crankshaft. The intake cam 54 rotates in conjunction with the intake camshaft 56. The intake valve 26 opens or closes the intake port 50 in accordance with the angle of rotation of the intake cam 54. When the intake valve 26 opens the intake port 50, air is taken into the combustion chamber 34 through the intake port 50.

The exhaust valve 28 is disposed in the exhaust port 52. The valve disc of the exhaust valve 28 is positioned at an opening of the exhaust port 52 that is on the combustion chamber 34. The proximal end of the exhaust valve 28 is in contact with an exhaust cam 58. The exhaust cam 58 is coupled to an exhaust camshaft 60. The exhaust camshaft 60 rotates in conjunction with the crankshaft. The exhaust cam 58 rotates in conjunction with the exhaust camshaft 60. The exhaust valve 28 opens or closes the exhaust port 52 in accordance with the angle of rotation of the exhaust cam 58.

When the exhaust valve 28 opens the exhaust port 52, gas in the combustion chamber 34 is discharged through the exhaust port 52.

The cylinder head 24 is provided with an injector 62 and a spark plug 64. The injector 62 and the spark plug 64 are positioned near the center axis of the cylinder 30. The injector 62 is oriented with the injection orifice thereof facing the combustion chamber 34. The injector 62 injects a fuel, such as gasoline, into the combustion chamber 34 with a predetermined timing. The spark plug 64 is oriented with the electrode thereof facing the combustion chamber 34. The spark plug 64 ignites a mixture of the air and the fuel (hereinafter also referred to as "air-fuel mixture") with a predetermined timing, thereby causing combustion. The combustion causes the piston 22 to reciprocate in the cylinder 30.

The engine controller 12 includes a central processing unit, a read-only memory (ROM) in which programs and other relevant data are stored, and a semiconductor integrated circuit including devices such as a random access memory (RAM) serving as a work area. The engine controller 12 controls relevant elements included in the engine 10 by executing the programs. For example, the engine controller 12 controls the timing of fuel injection by the injector 62 and the timing of ignition by the spark plug 64. Furthermore, the engine controller 12 controls the air supplier 14, which will be described below.

The air supplier 14 includes an air compression pump 70, an air common rail 72, an air pipe 74, an air port 76, an air chamber 78, connecting holes 80, and a valve mechanism 82.

The air compression pump 70 includes a pump body 90 and a compression mechanism 92. The pump body 90 is coupled to an inlet pipe 96 at an inlet 94 thereof. The inlet pipe 96 is coupled to, for example, an intake pipe provided between an air cleaner and a throttle valve (not illustrated). Air having flowed through the air cleaner is fed into the pump body 90 from the inlet pipe 96. The inlet pipe 96 may be coupled to another filter, instead of the air cleaner provided to the intake pipe. In such a case, air taken from another location, instead of the air taken through the intake pipe, is fed into the pump body 90 through the inlet pipe 96.

The compression mechanism 92 compresses the air introduced from the inlet pipe 96 into a compression chamber, provided in the pump body 90, and discharges the compressed air from an outlet 98 of the pump body 90. Hereinafter, the compressed air may be referred to as "high-pressure air" or simply "air".

The compression mechanism 92 includes, for example, a pump cam 100 and a plunger 102. The pump cam 100 is coupled to the intake camshaft 56 and rotates in conjunction with the intake camshaft 56. The proximal end of the plunger 102 is in contact with the pump cam 100. The distal end of the plunger 102 is positioned in the compression chamber of the pump body 90. The plunger 102 is configured to slide in conjunction with the rotation of the pump cam 100 and thus compresses the air in the compression chamber.

The compression mechanism 92 may include a plurality of pump cams 100 having different shapes or sizes. In such a case, the engine controller 12 switches the pump cam 100 to be brought into contact with the plunger 102 among the plurality of pump cams 100, in accordance with the state of operation such as the degree of throttle opening. Thus, the degree or timing of air compression is changeable. The engine controller 12 may advance or retard the activation of the intake camshaft 56. Since the pump cam 100 is coupled to the intake camshaft 56, the phase of the pump cam 100 changes with the advancing or retarding of the activation of the intake camshaft 56. Thus, the timing of air compression is changeable.

The pump cam 100 is not limited to the one that operates in conjunction with the intake camshaft 56. For example, the pump cam 100 may be coupled to the exhaust camshaft 60. In such a case, the timing of air compression may be changed with the advancing or retarding of the activation of the exhaust camshaft 60. Alternatively, the pump cam 100 may be coupled to an independent camshaft, neither the intake camshaft 56 nor the exhaust camshaft 60. In such a case, the timing of air compression may be changed with the advancing or retarding of the activation of the independent camshaft.

The air common rail 72 has, for example, a pipe shape and is coupled to the outlet 98 of the pump body 90. The air common rail 72 is disposed above the cylinder head 24 and extends over the plurality of cylinders 30. The air common rail 72 is capable of storing the high-pressure air discharged from the outlet 98 of the pump body 90, with the pressure of the high-pressure air being maintained.

The air common rail 72 has an opening 110 in the lateral face thereof. The opening 110 receives the air pipe 74 coupled thereto. The air pipe 74 is coupled to the air port 76 provided in the cylinder head 24. The air port 76 is separate from the intake port 50 and the exhaust port 52. The air port 76 is continuous with the air chamber 78 provided in the cylinder head 24. The air chamber 78 is positioned above the gap 40. The connecting holes 80 each extend downward from the air chamber 78 and allow the air chamber 78 and the gap 40 to communicate with each other. Thus, the air supplier 14 communicates with the gap 40.

Figure 2:
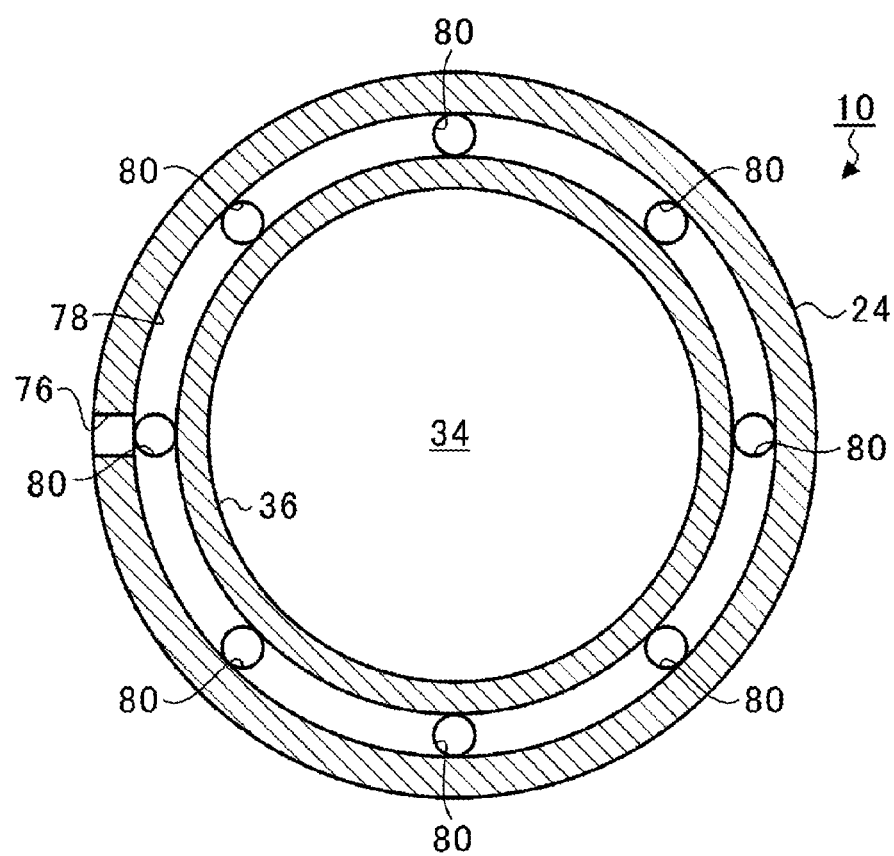
FIG. 2 is a transparent plan view of a cylinder head and a combustion chamber.

FIG. 2 is a transparent plan view of the cylinder head 24 and the combustion chamber 34. As illustrated in FIG. 2, the air chamber 78 has an annular shape surrounding the combustion chamber 34. The air port 76 extends through the outer wall of the air chamber 78 at one position. The connecting holes 80 are dispersed in the circumferential direction of the air chamber 78. For example, eight connecting holes 80 are provided at regular intervals in the circumferential direction of the air chamber 78. The number and positions of the connecting holes 80 are not limited to those illustrated in FIG. 2 and may be designed in any way.

Referring to FIG. 1, the valve mechanism 82 includes an air valve 120 and an air cam 122. The valve disc of the air valve 120 is positioned at the opening 110 provided in the air common rail 72 and to which the air pipe 74 is coupled. The proximal end of the air valve 120 is in contact with the air cam 122. The air cam 122 is coupled to the intake camshaft 56 and rotates in conjunction with the intake camshaft 56. The air valve 120 opens or closes the opening 110 of the air common rail 72 in accordance with the angle of rotation of the air cam 122.

When the opening 110 is closed by the air valve 120, the high-pressure air is not fed into the air pipe 74. When the opening 110 is opened by the air valve 120, some of the high-pressure air in the air common rail 72 is fed into the air pipe 74 through the opening 110. The high-pressure air thus fed into the air pipe 74 flows through the air pipe 74, the air port 76, the air chamber 78, and the connecting holes 80 and reaches the gap 40. Then, the high-pressure air in the gap 40 flows into the combustion chamber 34, which is positioned on the radially inner side with respect to the gap 40.

That is, the air supplier 14 supplies air through the gap 40 to a circumferential area of the combustion chamber 34 that is near the inner circumferential surface 36 of the cylinder 30.

The valve mechanism 82 may have a plurality of air cams 122 having different shapes or sizes. In such a case, the engine controller 12 switches the air cam 122 to be brought into contact with the air valve 120 among the plurality of air cams 122, in accordance with the state of operation such as the degree of throttle opening. Thus, the amount or timing of air supply is changeable. The engine controller 12 may advance or retard the activation of the intake camshaft 56. Since the air cam 122 is coupled to the intake camshaft 56, the phase of the air cam 122 changes with the advancing or retarding of the activation of the intake camshaft 56. Thus, the timing of air supply is changeable.

The air cam 122 is not limited to the one that operates in conjunction with the intake camshaft 56. For example, the air cam 122 may be coupled to the exhaust camshaft 60. In such a case, the timing of air supply may be changed with the advancing or retarding of the activation of the exhaust camshaft 60. Alternatively, the air cam 122 may be coupled to an independent camshaft, neither the intake camshaft 56 nor the exhaust camshaft 60. In such a case, the timing of air supply may be changed with the advancing or retarding of the activation of the independent camshaft.

As described above, the high-pressure air generated by the air compression pump 70 is supplied into the combustion chamber 34. Considering such a situation, the pressure in the combustion chamber 34 at the supply of the high-pressure air into the combustion chamber 34 is defined as the reference pressure. The air compression pump 70 generates high-pressure air having a pressure that is higher than the reference pressure, with the difference from the reference pressure being within a predetermined range. In short, the high-pressure air has a pressure that is a little higher than the reference pressure in the combustion chamber 34.

Since the high-pressure air has a pressure higher than the reference pressure in the combustion chamber 34, the high-pressure air generated by the air supplier 14 is allowed to be supplied into the combustion chamber 34. Furthermore, since the difference of the high-pressure air from the reference pressure in the combustion chamber 34 is within a predetermined range, the velocity of the high-pressure air flowing from the gap 40 into the combustion chamber 34 is relatively low. Therefore, the air-fuel mixture in the combustion chamber 34 is less likely to cause turbulence. The predetermined range for the pressure difference is set to a narrow range that is less likely to cause turbulence, taking the reference pressure in the combustion chamber 34 into account.

Since turbulence is less likely to occur, the high-pressure air that is supplied into the combustion chamber 34 by the air supplier 14 tends to be retained in the circumferential area of the combustion chamber 34 that is near the inner circumferential surface 36 of the cylinder 30. Effects produced by the high-pressure air will be described in detail separately below.

Figure 3:
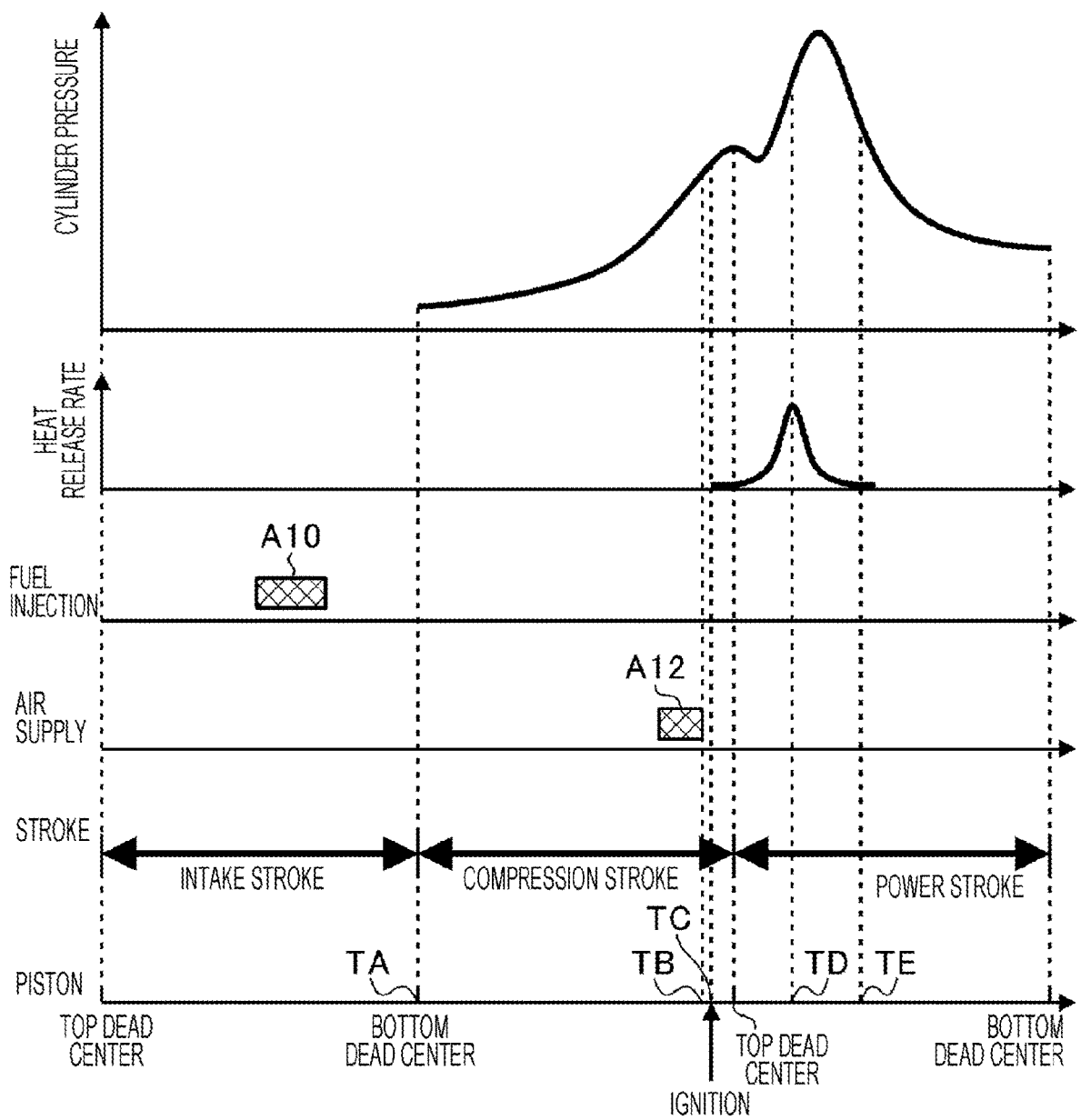
FIG. 3 illustrates the timing of supplying high-pressure air.

FIG. 3 illustrates the timing of supplying the high-pressure air. The engine 10 repeatedly undergoes a cycle of an intake stroke, a compression stroke, a power stroke, and an exhaust stroke in that order. The intake stroke occurs when the piston 22 moves from the top dead center to the bottom dead center. The compression stroke occurs after the intake stroke and when the piston 22 moves from the bottom dead center to the top dead center. The power stroke occurs after the compression stroke and when the piston 22 moves from the top dead center to the bottom dead center. The exhaust stroke (not illustrated) occurs after the power stroke and when the piston 22 moves from the bottom dead center to the top dead center.

In the intake stroke, the engine 10 takes in air through the intake port 50. As illustrated by cross-hatched area A10 in FIG. 3, the engine controller 12 causes the injector 62 to inject the fuel during the intake stroke. Thus, in the intake stroke, the air taken in as above (hereinafter also referred to as "intake air") and the fuel injected from the injector 62 are mixed in the combustion chamber 34, whereby an air-fuel mixture is obtained. At time TA in FIG. 3, the stroke changes from the intake stroke to the compression stroke.

When the compression stroke starts, the piston 22 is raised to compress the air-fuel mixture in the combustion chamber 34, which raises the cylinder pressure, i.e., the pressure in the combustion chamber 34. Then, at predetermined time TC in a late phase of the compression stroke, the engine controller 12 causes the spark plug 64 to ignite the air-fuel mixture.

Meanwhile, as illustrated by cross-hatched area A12 in FIG. 3, before the spark plug 64 ignites the air-fuel mixture, the air supplier 14 supplies air (i.e., the high-pressure air) into the combustion chamber 34 through the gap 40.

The time for starting air supply by the air supplier 14 is set to, for example, a point between the time for ending fuel injection and the time for ignition (i.e., time TC). At a time point earlier by a predetermined length than the time for ignition, the air supplier 14 causes the air valve 120 to open the opening 110, thereby starting the supply of the high-pressure air. To start air supply by the air supplier 14 with an appropriate timing, the engine controller 12 may, for example, switch the air cam 122 of the valve mechanism 82 among a plurality of air cams 122.

At time TB in FIG. 3, air supply by the air supplier 14 is ended. The time for ending air supply by the air supplier 14 is set to a point before the time for ignition (i.e., time TC). Note that at least the time for starting air supply by the air supplier 14 is set to a point before the time for ignition. The time for ending air supply by the air supplier 14 may be set to a point after the time for ignition.

As described above, the combustion chamber 34 bears the air-fuel mixture composed of the intake air and the fuel that are obtained during the intake stroke, and the high-pressure air generated by the air supplier 14. In the engine 10, the amount of intake air, the amount of fuel injection, and the amount of high-pressure air are adjusted such that stoichiometry is established in the gas composed of the air-fuel mixture and the high-pressure air as a whole. In other words, taking the high-pressure air into account, a rich air-fuel mixture with a large fuel ratio, with reference to stoichiometry, is generated from the intake air and the fuel.

For example, the rich air-fuel mixture has an equivalence ratio, representing the ratio of fuel to air, of about 1.1. That is, letting the amount of air for stoichiometry be 100%, 90% of the amount of air for stoichiometry is covered by the intake air, while 10% of the amount of air for stoichiometry is covered by the air supplied by the air supplier 14.

The engine controller 12 determines the amount of air for stoichiometry and the amount of fuel injection in accordance with the state of operation such as the degree of throttle opening. The engine controller 12 derives the amount of high-pressure air supplied by the air supplier 14 from the amount of air for stoichiometry. The engine controller 12 determines the time for starting the supply of the high-pressure air in accordance with the amount of high-pressure air. The engine controller 12 adjusts relevant operations, such as the switching of the air cam 122, so that the high-pressure air starts to be supplied at the time determined as above.

As illustrated in FIG. 3, when the air-fuel mixture is ignited, a flame starts to propagate, whereby the heat release rate in the combustion chamber 34 starts to rise. Once the heat release rate reaches its peak at time TD in FIG. 3, the heat release rate starts to decrease. At time TE in FIG. 3, the propagating flame reaches the entirety of the air-fuel mixture.

Figure 4A:
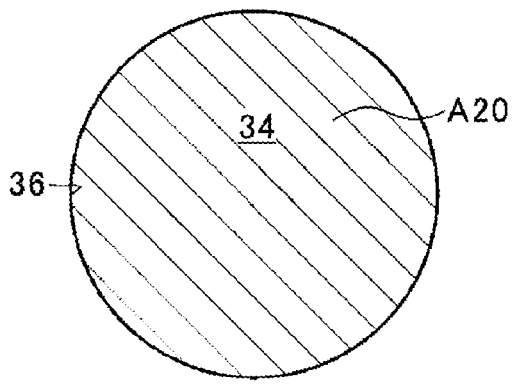
FIGS. 4A to 4E illustrate the combustion chamber in different states.
Figure 4B:
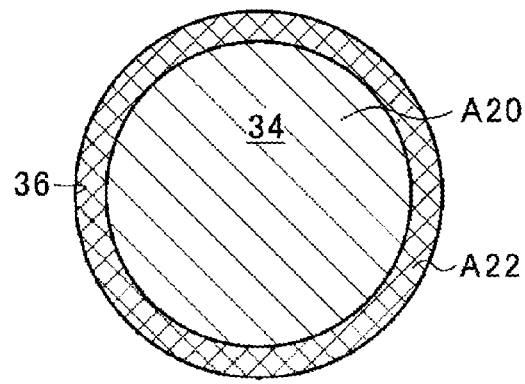
Figure 4C:
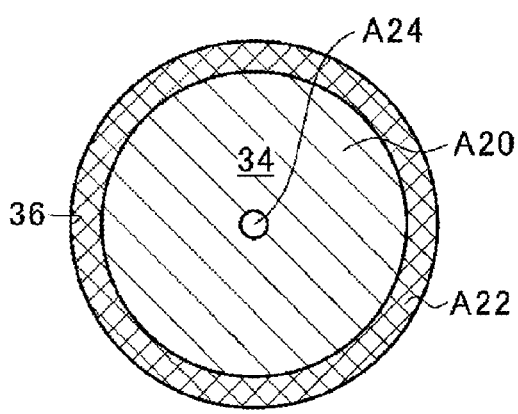
Figure 4D:
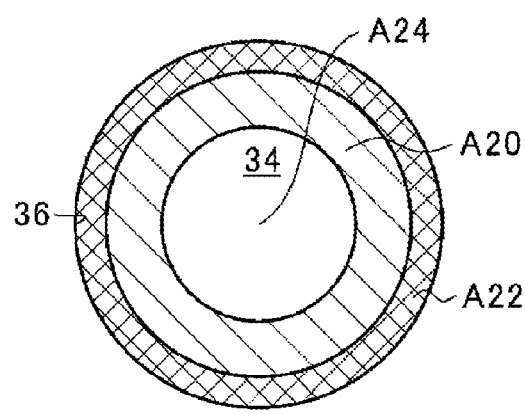
Figure 4E:
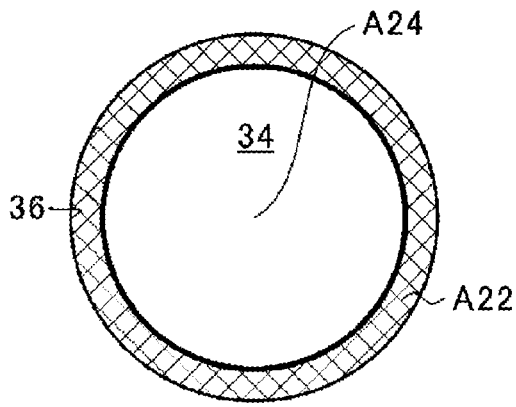

FIGS. 4A to 4E illustrate the combustion chamber 34 in different states. FIG. 4A illustrates the state of the combustion chamber 34 at time TA illustrated in FIG. 3. FIG. 4B illustrates the state of the combustion chamber 34 at time TB illustrated in FIG. 3. FIG. 4C illustrates the state of the combustion chamber 34 at time TC illustrated in FIG. 3. FIG. 4D illustrates the state of the combustion chamber 34 at time TD illustrated in FIG. 3. FIG. 4E illustrates the state of the combustion chamber 34 at time TE illustrated in FIG. 3.

At time TA, as illustrated by hatched area A20 in FIG. 4A, the combustion chamber 34 is filled with a rich air-fuel mixture composed of the intake air and the fuel. The combustion chamber 34 in this state receives the high-pressure air from the air supplier 14.

The high-pressure air is supplied to the circumferential area of the combustion chamber 34 that is near the inner circumferential surface 36 of the cylinder 30, and is therefore less likely to cause turbulence in the combustion chamber 34. The high-pressure air pushes the rich air-fuel mixture, which has already been present in the combustion chamber 34, toward the center axis of the cylinder 30. Hence, the rich air-fuel mixture already present in the combustion chamber 34 is gathered to a central area of the combustion chamber 34.

Consequently, an air-fuel-mixture layer composed of the rich air-fuel mixture is formed in the central area as illustrated by hatched area A20 in FIG. 4B, while an air layer composed of the high-pressure air is formed in the circumferential area as illustrated by cross-hatched area A22 in FIG. 4B. To summarize, when the air supplier 14 supplies air to the circumferential area of the combustion chamber 34, the rich air-fuel mixture that is present in the combustion chamber 34 is gathered to the central area of the combustion chamber 34 such that a stratified body consisting of a layer of the air-fuel mixture (herein after referred to as "air-fuel-mixture layer") in the central area and a layer of the air (hereinafter referred to as "air layer") in the circumferential area is formed. The air layer is formed by the replacement of the air-fuel mixture, which is already present, with the high-pressure air. Therefore, the air layer contains substantially no fuel.

When the air-fuel mixture in the above stratified body is ignited, a flame is generated near the center of the combustion chamber 34. That is, the combustion of the air-fuel mixture starts from the white area, A24, illustrated in FIG. 4C. The flame thus generated starts to propagate through the air-fuel mixture, and the range of combustion of the air-fuel mixture is widened as illustrated by the white area, A24, in FIG. 4D. Eventually, the entirety of the air-fuel mixture gathered in the central area is combusted as illustrated by the white area, A24, in FIG. 4E.

In this state, the air layer is present in the circumferential area of the combustion chamber 34. Therefore, the flame does not propagate into the circumferential area. That is, the air layer is not combusted. Hence, in the engine system 1, the distance of flame propagation or the distance of combustion of the air-fuel mixture is substantially reduced by the thickness of the air layer in the radial direction. Consequently, in the engine system 1, the entirety of the air-fuel mixture is combusted in a reduced time, before part of the air-fuel mixture that is yet to be combusted is ignited by itself. Thus, knocking is reduced.

The rich air-fuel mixture is gathered to the central area of the combustion chamber 34. Therefore, in the engine system 1, the combustion rate of the air-fuel mixture in the central area is higher than the combustion rate of an air-fuel mixture that is in stoichiometry. Consequently, in the engine system 1, the entirety of the air-fuel mixture is combusted in a more reduced time, and knocking is reduced further.

In the engine system 1, since the air-fuel mixture is gathered to the central area, the air-fuel mixture is combusted easily. Therefore, in the engine system 1, the unburned fuel loss, which is caused by any of the air-fuel mixture that is not combusted, is reduced.

The air layer formed in the circumferential area of the combustion chamber 34 also serves as a heat insulating layer that reduces the transmission of the heat generated by the combustion of the air-fuel mixture to the inner circumferential surface 36 of the cylinder 30. Therefore, in the engine system 1, the heat loss is reduced, in addition to knocking.

In the engine system 1, the air supplier 14 communicates with the gap 40, and the high-pressure air is supplied into the combustion chamber 34 through the gap 40. In other words, the air supplier 14 supplies the high-pressure air into the combustion chamber 34 not directly in the radial direction from the cylinder head 24 toward the center axis of the combustion chamber 34 but through the gap 40 in a direction from the cylinder head 24 toward the cylinder block 20, i.e., downward. Thus, in the engine system 1, the high-pressure air is redirected at the gap 40 before being introduced into the combustion chamber 34. Hence, the flow velocity of the high-pressure air is reduced. Consequently, in the engine system 1, the occurrence of turbulence at the supply of the high-pressure air is reduced appropriately. Accordingly, a stratified body consisting of an air-fuel-mixture layer and an air layer is formed appropriately.

If turbulence occurs in the combustion chamber 34 at the supply of the high-pressure air, the substantial distance of flame propagation may not be reduced satisfactorily, leading to a possibility of insufficient knock reduction. Hence, in the engine system 1 according to the present embodiment, a stratified body consisting of an air-fuel-mixture layer and an air layer is formed in such a manner that turbulence is less likely to occur. Thus, the substantial distance of flame propagation is reduced appropriately. Consequently, knocking of the engine 10 is reduced more appropriately.

While an embodiment of the disclosure has been described above with reference to the accompanying drawings, the present disclosure is not limited thereto, needless to say. It is obvious that those skilled in the art can conceive various changes or modifications within the scope defined by the appended claims. It is of course understood that such changes or modifications are included in the technical scope of the disclosure.

For example, in the above embodiment, high-pressure air is supplied from the air chamber 78 into the gap 40 through the connecting holes 80. Alternatively, the connecting holes 80 may directly allow the air chamber 78 and the combustion chamber 34 to communicate with each other, with no gap 40. In such a case, the flow velocity of the high-pressure air is set to a value that is less likely to cause turbulence in the combustion chamber 34 and such that a stratified body consisting of an air-fuel-mixture layer and an air layer is formed. For example, the connecting holes 80 may be provided in the form of microholes that are open on the combustion chamber 34. However, the embodiment employing the connecting holes 80 that are continuous with the gap 40 is more appropriate in terms of the formation of a stratified body consisting of an air-fuel-mixture layer and an air layer.

The invention claimed is:

1. An engine system comprising:
a combustion chamber formed in a cylinder; and
an air supplier configured to supply air to a circumferential area of the combustion chamber, the circumferential area being near an inner circumferential surface of the cylinder,
wherein the air supplier is configured to supply air to the circumferential area before ignition to gather a rich air-fuel mixture that is present in the combustion chamber to a central area of the combustion chamber such that a stratified body comprising a layer of the air-fuel mixture in the central area and a layer of the air in the circumferential area is formed, and
wherein a gap is provided between a cylinder block and a cylinder head, the cylinder head being disposed on the cylinder block and covering the cylinder.

2. The engine system according to claim 1, wherein the gap is continuous with the combustion chamber.

3. The engine system according to claim 1, wherein the cylinder block comprises the cylinder.

4. The engine system according to claim 1, wherein the air supplier communicates with the gap and is configured to supply the air to the circumferential area through the gap.

5. The engine system according to claim 1, wherein the gap is a flat annular space surrounding the combustion chamber.

6. The engine system according to claim 1, wherein the air supplier supplies the air into the combustion chamber through the gap in a direction from the cylinder head toward the cylinder block.

7. The engine system according to claim 1, wherein the air is redirected at the gap before being supplied to the combustion chamber.

8. An engine system comprising:
a combustion chamber formed in a cylinder; and
an air supplier configured to supply air to a circumferential area of the combustion chamber, the circumferential area being near an inner circumferential surface of the cylinder,
wherein the air supplier is configured to supply air to the circumferential area before ignition to gather a rich air-fuel mixture that is present in the combustion chamber to a central area of the combustion chamber such that a stratified body comprising a layer of the air-fuel mixture in the central area and a layer of the air in the circumferential area is formed,
wherein a gap is provided between a cylinder block and a cylinder head, the cylinder block comprising the cylinder, the cylinder head being disposed on the cylinder block and covering the cylinder, and
wherein the air supplier communicates with the gap and is configured to supply the air to the circumferential area through the gap.

9. The engine system according to claim 8, wherein the gap is continuous with the combustion chamber.

10. The engine system according to claim 8, wherein the gap is a flat annular space surrounding the combustion chamber and is continuous with the combustion chamber.

11. The engine system according to claim 8, wherein the gap is a flat annular space surrounding the combustion chamber.

12. The engine system according to claim 8, wherein the air supplier supplies the air into the combustion chamber through the gap in a direction from the cylinder head toward the cylinder block.

13. An engine system comprising:
a combustion chamber formed in the cylinder;
a cylinder head disposed on a cylinder block;
an air supplier configured to supply air to a circumferential area of the combustion chamber,
wherein the air supplier communicates with a gap and is configured to supply air through the gap to the circumferential area before ignition to gather a rich air-fuel mixture that is present in the combustion chamber to a central area of the combustion chamber such that a stratified body comprising a layer of the air-fuel mixture in the central area and a layer of the air in the circumferential area is formed, and
wherein the cylinder block comprises the cylinder.

14. The engine system according to claim 13, wherein the gap is provided between the cylinder block and the cylinder head.

15. The engine system according to claim 13, wherein the gap is provided between the cylinder block and the cylinder head and is continuous with the combustion chamber.

16. The engine system according to claim 13,
wherein the circumferential area is near an inner circumferential surface of the cylinder, and
wherein the gap is provided between the cylinder block and the cylinder head.

17. The engine system according to claim 13,
wherein the air supplier supplies air through the gap to the circumferential area of the combustion chamber, the gap being provided between the cylinder block and the cylinder head.

18. The engine system according to claim 13, wherein the cylinder head is disposed on the cylinder to cover the cylinder and is coupled to the cylinder block.

19. The engine system according to claim 13, the gap being provided between the cylinder block and the cylinder head,
wherein the air supplier supplies the air into the combustion chamber through the gap in a direction from the cylinder head toward the cylinder block.

20. The engine system according to claim 13, wherein the air is redirected at the gap before being supplied to the combustion chamber, the gap being provided between the cylinder block and the cylinder head.

* * * * *